Patented Nov. 24, 1931

1,833,464

UNITED STATES PATENT OFFICE

CORNELIUS H. KELLER, OF SAN FRANCISCO, CALIFORNIA, ASSIGNOR TO MINERALS SEPARATION NORTH AMERICAN CORPORATION, OF NEW YORK, N. Y., A CORPORATION OF MARYLAND

ORE CONCENTRATION

No Drawing.　　　Application filed September 10, 1929.　Serial No. 391,701.

This invention relates to ore concentration and is herein illustrated as applied to the froth-flotation concentration of ores.

It has heretofore been proposed to utilize as flotation agents various organic compounds for increasing the efficiency of the froth-flotation process in concentrating the metalliferous minerals in ores. According to the present invention such an agent may consist of or contain an organic compound the molecules of which contain a 5-membered ring in which the ring is formed by four carbon atoms and a fifth atom which is some other element, such as oxygen or sulphur.

Compounds of this nature may be obtained from furfural and thiophene, the former being an aldehyde which is a derivative of the 5-membered ring radical formed by four carbon atoms and one oxygen atom, and the latter being a substance having a 5-membered ring formed by four carbon atoms, each united to hydrogen, and one sulphur atom.

When furfuryl alcohol is prepared from furfural and then the alcohol thus prepared is treated with caustic alkali and carbon disulphide in substantially mono-molecular proportions, there is obtained a reaction product which may be used as an agent for increasing the efficiency of the froth-flotation process and other flotation processes. Not only is this agent effective in increasing the recovery of the desired metal in many ores, but it also, in some ores, causes the concentration operation to yield a concentrate of extraordinary richness; and, moreover, in an iron-bearing copper ore the agent may have the effect of markedly increasing the recovery of copper and the richness of the concentrate, while at the same time it minimizes the tendency of the iron to concentrate with the copper. Other features and advantages will hereinafter appear.

Furfural, or as it is more accurately known, furfural-aldehyde, was converted to furfuryl alcohol, a clear sirupy liquid soluble in water, alcohol or ether. To this alcohol was added a solution of potassium hydroxide, and to this mixture was added carbon disulphide. A reaction product consisting of a light yellowish-brown crystalline mass, easily soluble in water, was formed. The crystalline product was washed with ether. The quantities of reagents used were substantially proportional to their molecular weights.

A corresponding reaction product was made in which sodium hydroxide was used instead of potassium hydroxide.

A corresponding reaction product was also made by adding carbon disulphide to a solution of furfuryl alcohol in ether in which metallic potassium had been dissolved.

These reaction products have been found to consist mainly of furfuryl xanthate which has been separated by crystallization from cold acetone. It was found that crude furfuryl xanthate could be prepared by the above-described reactions with less than ten per cent of impurities thus separable. Moreover, it was found that these impurities were substantially inert in froth-flotation procedures.

The aqueous solution of the reaction product first mentioned gave with copper sulphate solution a yellow precipitate which quickly turned brown and finally black on standing. An oily sulphur-containing liquid was formed simultaneously with the yellow precipitate.

A similar oily sulphur-containing liquid was obtained when an aqueous solution of the reaction product first mentioned was treated with a small proportion of iodine.

The foregoing crystalline reaction products in the examples hereinafter given were used when freshly prepared, and were found to be very effective agents in the froth-flotation concentration of ores, but other tests with old lots of some of these crystalline reaction products showed that they had altered or decomposed in the course of several days so that they had become less effective, but it was found possible to prepare a much more stable agent by grinding together relatively coarse caustic potash, furfuryl alcohol and carbon disulphide, in approximately monomolecular proportions and stopping the grinding at such a time that there was obtained a strongly alkaline reaction product. This alkaline reaction product proved fully as effective an agent as those described above, and did not seem to deteriorate upon storage either as a dry salt or in solution. It was found, however, that the reaction product obtained by prolonged grinding of the same substances in the same proportions to ensure completion of the reactions, was less stable.

*Example I.*—Copper ore from the Walker mine, California, previously ground to 10-mesh was reground in a ball-mill with three pounds of calcium oxide per ton, until 78.2% passed a 200-mesh sieve. It was made into a pulp with water and agitated for five minutes with 0.2 pounds of pine oil and 0.1 pound of the reaction product first described above, both per ton of dry material, and a rougher froth concentrate removed, the operation being carried out in a minerals separation spitzkasten subaeration testing machine. The concentrate was made into a pulp with water and reagitated to yield a finished concentrate and a middling. The results are shown in the following table:

|   | % wt. | % Cu | % Fe | % Cu recy. | % Fe recy. |
|---|---|---|---|---|---|
| Heads | 100.0 | 7.19 | 14.34 | 100.0 | 100.0 |
| Conc | 20.9 | 31.2 | 30.0 | 90.6 | 43.6 |
| Midd | 5.25 | 8.04 | 17.6 | 5.9 | 6.4 |
| Tail | 73.85 | 0.34 | 9.7 | 3.5 | 50.0 |

*Example II.*—10-mesh Anaconda ore was reground in a ball mill without the addition of any agent until 78.5% passed a 200-mesh sieve. The material was then made into a pulp with water and agitated with 0.28 pounds of terpineol and 0.2 pounds of the same reaction product, both per ton of ore, and a froth separated as in the preceding example. The results are shown in the following table:

|   | % wt. | Cu assay % | % Cu recovery |
|---|---|---|---|
| Heads | 100.0 | 3.27 | 100.0 |
| Conc | 21.02 }30.53 | 12.40 }10.13 | 79.61 }94.48 |
| Midd | 9.51 | 5.12 | 14.87 |
| Tail | 69.57 | 0.26 | 5.52 |

*Example III.*—Ore of the Universal Exploration Company was reground in a ball mill until 78.4% passed a 200-mesh sieve. It was then made into a pulp with water and there was added during agitation 1.5 pounds of copper sulphate, 0.3 pounds of the same reaction product, and 0.2 pounds of pine oil, all per ton of ore, and a rougher froth concentrate collected as in the preceding example. The concentrate was then re-agitated without addition of further agents to yield a finished concentrate and a middling. The results are shown in the following table:

|   | % wt. | Zn assay % | % Zn recovery |
|---|---|---|---|
| Heads | 100.0 | 16.81 | 100.00 |
| Conc | 25.18 }28.68 | 63.2 }58.08 | 94.65 }99.06 |
| Midd | 3.50 | 21.2 | 4.41 |
| Tail | 71.32 | 0.22 | 0.93 |

*Example IV.*—A 10-mesh Parroquia ore from Zacatecas, Mexico, was reground in a ball mill until 90.5% passed a 200-mesh sieve. It was then made into a pulp with water and agitated for three minutes with 6 pounds of sodium carbonate, 0.2 pounds of sodium cyanide, and 3 pounds of zinc sulphate, all per ton of ore, and agitated for three minutes; then there was added 0.1 pound of the same reaction product and 0.2 pounds of cresylic acid, both per ton of ore, and the agitation was continued for one minute and thereafter a copper-bearing froth concentrate was removed for four minutes during continued agitation. There was then added to the pulp 1.5 pounds of copper sulphate, 0.2 pounds of the same reaction product and 0.3 pounds of Barrett No. 634 oil, all per ton of original ore, and a zinc-bearing froth concentrate was removed for five minutes. The zinc-bearing concentrate was then retreated by reagitation with a further addition of 4 pounds of calcium oxide, 0.1 pound of Barrett No. 634 oil, 0.2 pounds of cresylic acid, and 0.5 pounds of the same reaction product, all per ton of original ore, and separated into a finished zinc concentrate and a zinc middling. The results are shown in the following table:

|   | % wt. | Ag oz. | % Cu | % Zn | % recoveries | | |
|---|---|---|---|---|---|---|---|
|   |   |   |   |   | Ag | Cu | Zn |
| Heads | 100.0 | 7.08 | 4.83 | 7.0 | 100.0 | 100.0 | 100.0 |
| Cu Conc | 14.95 | 33.4 | 24.56 | 6.2 | 70.53 | 76.0 | 13.25 |
| Zn Conc | 11.88 | 3.5 | 3.72 | 46.0 | 5.87 | 9.15 | 78.10 |
| Zn Midd | 10.40 | 5.2 | 4.24 | 22.0 | 7.64 | 9.13 | 3.27 |
| Tails | 62.77 | 1.8 | 0.44 | 0.6 | 15.96 | 5.72 | 5.38 |

*Example V.*—To show the effect of the same reaction product on oxide copper material, a 10-mesh oxide-sulphide dump material from the Mazapil Copper Company's Aranzazu mine, was reground in a ball mill until 85% passed a 200-mesh sieve. The ground material was made into a pulp with water, and for a first rougher treatment was agitated for three minutes with 0.5 pounds of the same reaction product, 0.5 pounds of silicate of soda, and 0.2 pounds of pine oil, all per ton of dump material, and then a first or rougher froth concentrate was removed for twelve minutes. This rougher froth concentrate was re-agitated for five minutes without further addition of agents, to separate it into a finished sulphide concentrate and a sulphide middling. The pulp remaining from the first rougher frothing operation was then further agitated with a further addition of 3 pounds of the same reaction product per ton of dump material and a characteristic green malachite froth concentrate or oxide concentrate was separated for seven minutes. This malachite froth concentrate was further agitated for five minutes with 0.5 pounds of the same reaction product and 0.1 pound of pine oil, both per ton of dump material, to yield a finished concentrate and a middling. The results are shown in the following table:

|  | % wt. | Cu assay % | % Cu recovery |
|---|---|---|---|
| Heads | 100.0 | 1.44 | 100.0 |
| Sulfide Conc | 1.79 | 28.56 | 35.41 |
| Sulfide Midd | 7.36 | 2.40 | 12.23 |
| Oxide Conc | 0.60 | 30.26 | 12.58 |
| Oxide Midd | 3.08 | 2.80 | 5.97 |
| Tails | 87.17 | 0.56 | 33.81 |

*Example VI.*—10-mesh Utah copper ore was reground with four pounds of calcium oxide per ton of ore until 71% of it passed a 200-mesh sieve. It was then made into a pulp with water and agitated for five minutes with 0.1 pound of the same reaction product and 0.1 pound of pine oil, both per ton of ore, and a froth concentrate was separated for five minutes. The froth concentrate then was reagitated with the further addition of 0.05 pounds of pine oil per ton of ore to yield a finished concentrate and a middling. All the foregoing weights are per ton of ore. The results are shown in the following table:

|  | % wt. | % Cu | % Fe | % Cu recy. | % Fe recy. |
|---|---|---|---|---|---|
| Heads | 100.0 | 0.866 | 3.33 | 100.0 | 100.0 |
| Conc | 2.01 | 34.08 | 23.0 | 79.1 | 13.8 |
| Midd | 3.22 | 3.00 | 6.6 | 11.2 | 6.4 |
| Tail | 94.77 | 0.08 | 2.8 | 9.7 | 79.8 |

A slightly smaller recovery of copper and a larger rejection of iron were obtained when slightly reduced amounts of terpineol were substituted for the pine oil.

*Example VII.*—10-mesh ore from Desloge Consolidated Lead Company was reground in a ball mill for fifteen minutes until 90% passed 200 mesh. There was then added in the machine 0.2 pounds of the same reaction product and 0.14 pounds of terpineol, both per ton of ore, and agitated for five minutes. Then the froth concentrate was removed for five minutes; the results are shown in the following table:

|  | % wt. | Pb assay % | % Pb recovery |
|---|---|---|---|
| Heads | 100.0 | 4.70 | 100.0 |
| Conc | 8.425 | 54.40 | 97.47 |
| Tails | 91.575 | 0.13 | 2.53 |

*Example VIII.*—The same reaction product may be so used as to facilitate the differential separation of zinc and lead in a lead-zinc ore. A 10-mesh ore from the Federal Mining & Smelting Company was reground for twenty-five minutes until 90% passed a 200-mesh sieve with the addition of two pounds per ton of ore of sulphate of zinc in the grinding mill. There was then added 0.1 pound of the same reaction product and 0.15 pounds of cresylic acid, both per ton of ore, and agitated for two minutes and then a rougher lead froth-concentrated was removed for five minutes. There was then added to the pulp remaining in the machine 1.5 pounds of copper sulphate, 0.2 pounds of the same reaction product and 0.5 pounds of Barrett No. 634 oil, all per ton of original ore, agitation continued for two minutes and a zinc froth-concentrate removed for five minutes. The lead rougher concentrate was then put back into the machine and re-agitated for two minutes with the further addition of one pound of sulphate of zinc and 0.1 pound of cresylic acid, both per ton of original ore, and further agitated for five minutes to yield a finished concentrate and a middling. The zinc rougher concentrate was then put into the machine with a further addition of 0.5 pounds of copper sulphate, 0.1 pound of the same reaction product, 0.3 pounds of Barrett No. 634 oil and .05 pounds of pine oil, all per ton of original ore, and re-agitated for two minutes and then a finished zinc concentrate collected for five minutes, and the tailing constituted a zinc middling. The results are shown in the following table, together with a note showing the total recovery of lead in the lead concentrate and lead middling:

|  | % wt. | Ag oz. | % Pb | % Zn | % Ag recy. | % Pb recy. | % Zn recy. |
|---|---|---|---|---|---|---|---|
| Heads | 100.0 | 3.32 | 8.84 | 5.84 | 100.0 | 100.0 | 100.0 |
| Pb Conc | 8.87 | 26.1 | 74.8 | 4.5 | 69.8 | 75.07 | 6.83 |
| Pb Midd | 4.59 | 9.4 | 27.4 | 14.0 | 13.01 | 14.23 | 11.00 |
| Zn Conc | 8.87 | 4.1 | 3.5 | 51.2 | 10.97 | 3.51 | 77.72 |
| Zn Midd | 2.69 | 2.1 | 4.1 | 5.5 | 1.70 | 1.25 | 2.53 |
| Tail | 74.98 | 0.2 | 0.7 | 0.15 | 4.52 | 5.94 | 1.92 |
| Comb. Pb Conc. and Midd | 13.46 | 20.41 | 58.64 | 7.74 | 82.81 | 89.30 | 17.83 |

*Example IX.*—In addition to the crystalline reaction product used in the above examples, the strongly alkaline reaction product described above was used in concentrating ore from the Engels Copper Company. The suitably ground ore was made into a pulp with water and the pulp made alkaline with lime, and was agitated with enough of a 1% solution (which was 13 days old) of the strongly alkaline reaction product above described, so that there was added 0.1 pound of the reaction product per ton of ore. There was also added 0.1 pound pine-oil per ton of ore, and agitation continued and a rougher froth concentrate separated. This rougher froth concentrate was made into a pulp with water and reagitated to yield a finished concentrate and a middling. No additional agents were used during this reagitation. The results are shown in the following table:

|  | % wt. | % Cu | % Fe | % Cu recy. | % Fe recy. |
|---|---|---|---|---|---|
| Heads | 100.0 | 2.94 | 19.29 | 100.0 | 100.0 |
| Conc | 11.25 | 24.00 | 26.7 | 91.8 | 15.6 |
| Midd | 4.08 | 2.20 | 17.1 | 3.0 | 3.6 |
| Tail | 84.67 | 0.18 | 18.4 | 5.2 | 80.8 |

*Example X.*—In addtion to the reaction products used in the above examples, the oily product above described resulting from the treatment with copper sulphate of the crystalline reaction product above described, also proved remarkably efficient. A 10-mesh Utah copper ore was reground for ten minutes with four pounds of lime per ton of ore until 71% of it passed a 200-mesh sieve. It was then made into a pulp with water and agitated for five minutes with 0.3 pounds of the oily product just mentioned and with 0.14 pounds of terpineol, both per ton of ore, and a froth concentrate separated for five minutes. The results are shown in the following table:

|  | % wt. | Cu assay % | % Cu recy. |
|---|---|---|---|
| Heads | 100.0 | .877 | 100.0 |
| Conc | 6.52 | 11.44 | 85.07 |
| Tails | 93.48 | 0.14 | 14.93 |

*Example XI.*—Suitably ground ore from Anaconda Copper Mining Company was made into a pulp with water and with the usual amount of lime and agitated with 0.1 pound of the oily product obtained by the iodine treatment described above and with 0.2 pounds of pine oil, both per ton of ore, to yield a rougher froth-concentrate. The rougher concentrate was then reagitated with added water to yield a finished concentrate and a middling. The results are shown in the following table:

|  | % wt. | % Cu | % Fe | Cu % recy. | % Fe recy. |
|---|---|---|---|---|---|
| Heads | 100. | 4.42 | 13.08 | 100. | 100. |
| Conc | 14.6 | 27.84 | 25.6 | 92.0 | 28.6 |
| Midd | 9.4 | 1.94 | 14.5 | 3.9 | 10.4 |
| Tail | 76. | 0.24 | 10.5 | 4.1 | 61.0 |

The oily product obtained by the use of iodine also proved about equally effective on lead ores and zinc ores.

In addition to the materials used in the foregoing examples, it has been found that thiophene has the effect of improving the recovery of a metalliferous mineral when added to an ore pulp in a froth-flotation operation, thiophene being a 5-membered ring substance having the formula $C_4H_4S$.

*Example XII.*—An agent was prepared by boiling 5 grams of thiophene under a reflux condenser for 90 minutes with 1 grm. of sulphur chloride and 1 grm. of metallic zinc. The agent thus produced was used as follows in concentrating Utah copper ore.

The ore was suitably ground and made into a pulp with water, so that the pulp contained 4 pounds of calcium oxide per ton of ore, and then there was added 0.25 pounds of the foregoing agent and 0.14 pounds of terpineol, both per ton of ore. The pulp was agitated and a froth concentrate separated. The results are shown in the following table:

|  | % wt. | % Cu | % Cu recovery |
|---|---|---|---|
| Heads | 100.0 | 0.914 | 100.0 |
| Conc | 6.025 | 12.36 | 81.49 |
| Tails | 93.975 | 0.18 | 18.51 |

Having thus described certain embodiments of the invention what is claimed is:

1. The process of concentrating ores which consists in agitating a pulp of the ore under such conditions that a froth is formed in the presence of a xanthic derivative of a five-membered ring compound wherein the ring is formed by four carbon atoms and one non-carbon atom, and separating the float.

2. The process of concentrating ores which consists in agitating a pulp of the ore under such conditions that a froth is formed with an agent consisting of a xanthic derivative of a five-membered ring compound wherein the ring is formed by four carbon atoms and oxygen, and separating the float.

3. The process of concentrating ores which consists in agitating a pulp of the ore under such conditions that a froth is formed with an agent consisting of a five-membered ring compound wherein the ring is formed by four carbon atoms and one oxygen atom and the compound also contains sulphur, and separating the float.

4. The process of concentrating ores which consists in agitating a pulp of the ore under such conditions that a froth is formed with an agent consisting of a five-membered ring compound wherein the ring is formed by four carbon atoms and one non-carbon atom, and the compound also contains sulphur, and separating the float.

5. The process of concentrating ores which consists in agitating a pulp of the ore under such conditions that a froth is formed with an agent consisting of a five-membered ring compound wherein the ring is formed by four carbon atoms and one non-carbon atom, and the compound also contains sulphur in combination outside the ring, and separating the float.

6. The process of concentrating ores which consists in agitating a pulp of the ore under such conditions that a froth is formed with an agent consisting of a sulphur-containing derivative of furan, and separating the float.

7. The process of concentrating ores which consists in agitating a pulp of the ore under such conditions that a froth is formed with the reaction product obtained by treating furfuryl alcohol with caustic alkali and carbon disulphide, and separating the float.

8. The process of concentrating ores which consists in agitating a pulp of the ore under such conditions that a froth is formed with the reaction product obtained by treating furfuryl alcohol with an alkali metal hydroxide and carbon disulphide, and separating the float.

9. The process of concentrating ores which consists in agitating a pulp of the ore under such conditions that a float is formed in the presence of furfuryl xanthate, and separating the float.

In testimony whereof, I have affixed my signature to this specification.

CORNELIUS H. KELLER.